United States Patent [19]
Walker

[11] Patent Number: 5,867,933
[45] Date of Patent: Feb. 9, 1999

[54] PLANAR BOARD WITH STRIKE INDICATOR

[76] Inventor: Jack A. Walker, N38 W27273 Parkside Rd., Pewaukee, Wis. 53072

[21] Appl. No.: 825,627

[22] Filed: Mar. 31, 1997

[51] Int. Cl.[6] .......................... A01K 91/08; A01K 97/12
[52] U.S. Cl. ................................. 43/43.13; 43/17
[58] Field of Search ................ 43/16, 17, 43.13

[56] References Cited

U.S. PATENT DOCUMENTS

| | | | |
|---|---|---|---|
| D. 196,888 | 11/1963 | Pilsner | 43/17 |
| 885,627 | 4/1908 | Loehr | 43/17 |
| 2,785,493 | 3/1957 | Thiel | 43/17 |
| 2,901,857 | 9/1959 | Lockert | 43/43.13 |
| 3,067,539 | 12/1962 | Black | 43/43.13 |
| 3,507,068 | 4/1970 | Roberts | 43/17 |
| 3,973,347 | 8/1976 | Kearney | 43/17 |
| 4,028,840 | 6/1977 | Wille | 43/43.13 |
| 4,138,793 | 2/1979 | Kellie | 43/43.13 |
| 4,524,538 | 6/1985 | Halvorsen | 43/43.13 |
| 4,703,580 | 11/1987 | Kammeraad | 43/43.13 |
| 4,745,702 | 5/1988 | Koch | 43/43.13 |
| 4,763,437 | 8/1988 | Cuda | 43/43.13 |
| 4,920,689 | 5/1990 | Anderson | 43/43.13 |
| 4,928,419 | 5/1990 | Forrestal | 43/17 |
| 4,980,986 | 1/1991 | Harper | 43/17 |
| 5,005,310 | 4/1991 | Rinehart | 43/17 |
| 5,067,269 | 11/1991 | Eppley et al. | 43/17 |
| 5,170,581 | 12/1992 | Lyons | 43/17 |
| 5,341,591 | 8/1994 | Hicks | 43/43.13 |
| 5,488,796 | 2/1996 | Taylor et al. | 43/17 |
| 5,548,919 | 8/1996 | Hicks | 43/43.13 |

*Primary Examiner*—Michael J. Carone
*Assistant Examiner*—Darren Ark
*Attorney, Agent, or Firm*—Donald J. Ersler

[57] ABSTRACT

A first embodiment of a planar board with strike indicator includes a base, a light source, a tip-up assembly, an actuation assembly, and a switch. An actuating fishing line release is pivotally connected to an plunger. A fishing line is retained by a front fishing line release, the actuating fishing line release, and a quick release guide. When a fish strikes the lure, the actuating fishing line release pivots away from the front fishing line release, the pole is released to display a flag, and the switch is closed to supply the light source with current from an electrical power source. In a second preferred embodiment, the planar board with strike indicator utilizes a pivotal arm instead of an actuation assembly. A second end of the pivotal arm retains the pole of until a fish strike rotates the pivotal arm against the spring force of an arm extension spring until the pole is released. When the pole is released, a switch closes and the light source emits light. In a third preferred embodiment, the planar board with strike indicator utilizes a sliding rod instead of an actuation assembly. A retention clip on a second end of the sliding rod retains the pole. When the pole is released, a switch closes and the light source emits light. In a fourth and fifth preferred embodiments, a rotating pole is substituted for the actuation assembly and tip-up assembly. In a sixth preferred embodiment a fishing line switch is substituted for the actuation assembly and tip-up assembly. In a seventh preferred embodiment a rotating fishing line release and notch switch are used.

36 Claims, 7 Drawing Sheets

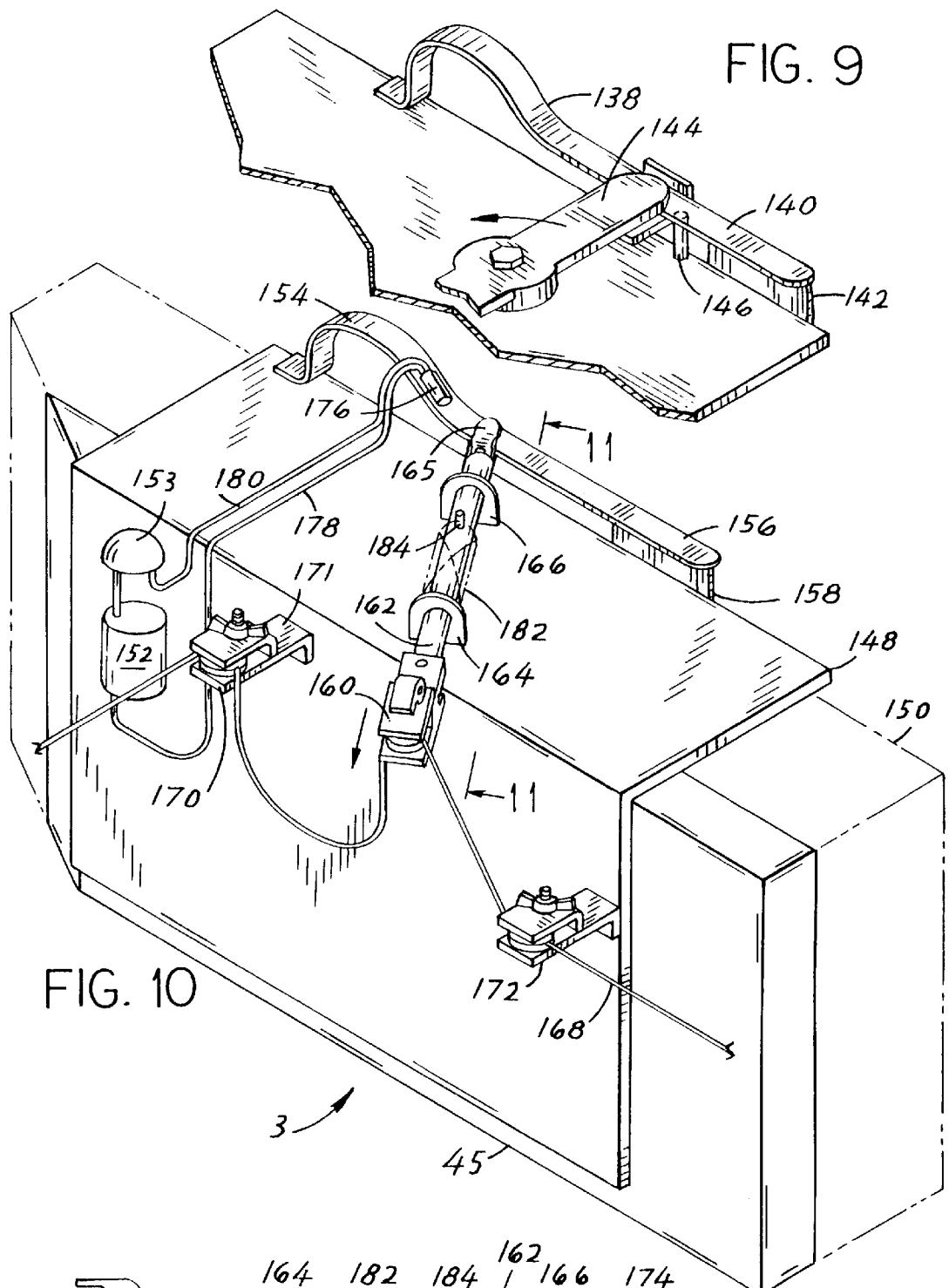
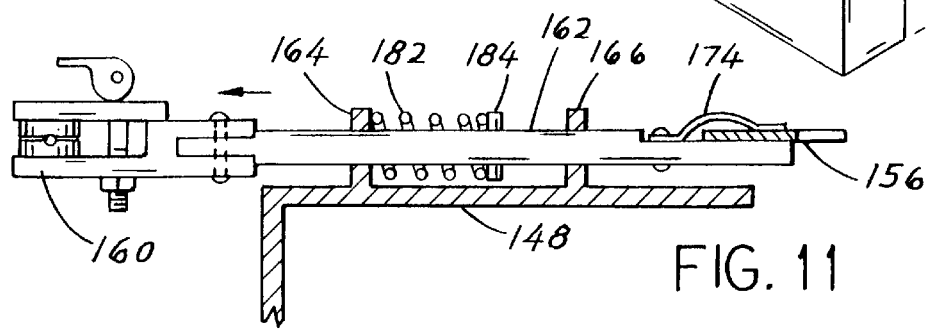

PLANAR BOARD WITH STRIKE INDICATOR

BACKGROUND OF THE INVENTION

1. Field of the Invention

The present invention relates generally to planar boards and more specifically to a planar board with strike indicator which allows a user to see if a fish has hit a lure during the day, or night.

2. Discussion of the Prior Art

Planar boards allow at least one fishing line to be fished at a predetermined distance from a trolling boat. The planar board tracks and pulls parallel to the side of the boat at the predetermined distance. Unfortunately, the planar board has no way of indicating whether a fish has struck a lure attached to a line on the planar board. The planar board will also not indicate if a lure is fouled in weeds or on the bottom of a lake. If a boat continues to pull a lure fouled in weeds or on the bottom of a lake, the planar board and all associated equipment may become lost if the fishing line snaps.

There have been a few prior art attempts to remedy the above situation. Unfortunately, all have different drawbacks. U.S. Pat. No. 4,028,840 to Wille discloses a planar board with a squirming flag post. The drawback to this design is that the line is attached to the end of the pole and will not fully rise when a fish strikes the line. U.S. Pat. No. 4,763,437 to Cuda discloses a double hull floating device which is purposed for stream fishing and not trolling. U.S. Pat. No. 3,973,347 to Kearney discloses a double hull floating device which is proposed for still fishing and not trolling. Although the lighting device could indicate a strike during the night, the lights would not be visible during the day. The lighting device mechanism also has numerous elements.

Accordingly, there is a clearly felt need in the art for a planar board with strike indicator which indicates whether a fish strike has occurred during the day or night.

SUMMARY OF THE INVENTION

The primary objective of the present invention is to provide a planar board with strike indicator which indicates whether a fish strike has occurred during the day or night.

According to the present invention, a first embodiment of a planar board with strike indicator includes a base, a light source, a tip-up assembly, an actuation assembly, and a switch. The base can be a planar board, or a right angle plate which may be fastened to an existing planar board. The tip-up assembly includes an extension spring, a pole, and a flag disposed at the end of the pole. The light source may be a light bulb, a light emitting diode, or any suitable illumination device. The actuation assembly has an actuating fishing line release which is pivotally connected to a plunger. The actuating fishing line release is retarded from pivoting by the force generated from a compression spring. A nut is screwed on to a threaded second end of the plunger. The plunger has a pole groove disposed at the second end which retains the pole of the tip-up assembly. A first ear and a second ear retain the actuation assembly and prevent release of the pole.

A fishing line is retained by a front fishing line release, and an actuating fishing line release. A slack portion is created in the fishing line between the front and actuating fishing line releases. The front fishing line release is rigidly attached to a projection at a front end of the base. A quick release guide is optional. The quick release guide is rigidly attached to a rear end of the base when used. A lure is attached to the end of the fishing line. The plunger slides axially through the first and second ears. An end of the actuating fishing line release is formed into a cam surface which is pivotally connected to a first end of the plunger. The actuating fishing line release is prevented from pivoting by the force exerted from the compression spring.

When a fish strikes the lure, the actuating fishing line release pivots away from the front fishing line release. The switch is formed from the second end of the plunger and an electrical contact pad. When a straight portion of the cam surface is overcome, the second end of the plunger is forced against the electrical contact pad, the pole is released to display a flag, and the light source emits light. A hot wire is connected from an electrical power source to a contact sleeve which is mounted to the plunger. A connection wire is connected from the electrical contact pad to a light source. When the second end of the plunger contacts the plunger pad, the light source is supplied with electrical current.

In a second preferred embodiment, the planar board with strike indicator utilizes a pivotal arm instead of an actuation assembly. The planar board with strike indicator includes a base, a light source, a tip-up assembly, a pivotal arm, and a switch. The base can be a planar board, or a right angle plate which may be fastened to an existing planar board. The tip-up assembly includes an extension spring, a pole, and a flag disposed at the end of the pole. The pivotal arm has a actuating fishing line release which is rigidly fastened to a first end thereof. The second end of the pivotal arm retains the pole. Rotation of the pivotal arm is constrained by an arm extension spring which is fastened to a rod.

A fishing line is retained by a front fishing line release, actuating fishing line release. A slack portion is created in the fishing line between the front and actuating fishing line release. The front fishing line release is rigidly attached to a projection at a front end of the base. A quick release guide is optional. The actuating fishing line release is rigidly fastened to the first end of the pivotal arm. The quick release guide is rigidly attached to a rear end of the base when used. A lure is attached to the end of the fishing line. When a fish strikes the lure, the pivotal arm is pulled away from the front fishing line release. When the second end of the pivotal arm clears the pole of the tip-up assembly, the pole is released to display the flag. When the pole is released a switch closes and the light source is supplied with electrical current.

In a third preferred embodiment, the planar board with strike indicator utilizes a sliding rod instead of an actuation assembly. The planar board with strike indicator includes a base, a light source, a tip-up assembly, a switch, and the sliding rod. The base can be a planar board, or a right angle plate which may be fastened to an existing planar board. The tip-up assembly includes an extension spring, a pole, and a flag disposed at the end of the pole. The sliding rod has an actuating fishing line release which is rigidly fastened to a first end thereof. A second end of the sliding rod retains the pole. A compression spring biases the fishing line release toward the pole.

A fishing line is retained by a front fishing line release, an actuating fishing line release, and a rear fishing line release. A slack portion is created in the fishing line between the front and actuating fishing line releases. The front fishing line release is rigidly attached to a projection at a front end of the base, and the rear fishing line release is rigidly attached to the base at a rear end. A lure is attached to an end of the fishing line. When a fish strikes the lure, the sliding rod is pulled back, and the pole is released from a retention clip. The rear fishing line release controls the amount of force required to release the pole. A nut threaded on to the sliding rod may be substituted for the rear fishing line release. When the pole is released a switch closes and the light source is supplied with electrical current.

In a fourth preferred embodiment, the planar board with strike indicator utilizes a rotating pole instead of an actuation assembly. The planar board with strike indicator includes a base, a light source, a switch, and the rotating pole. The base can be a planar board, or a right angle plate which may be fastened to an existing planar board. The rotating pole has an axle portion, a pole portion, and a flag disposed at the end of the pole. An actuating fishing line release is fastened to the end of the axle portion.

A fishing line is retained by a front fishing line release, an actuating fishing line release, and a rear fishing line release. A slack portion is created in the fishing line between the front and actuating fishing line releases. The front fishing line release is rigidly attached to a projection at a front end of the base, and the rear fishing line release is rigidly attached to the base at a rear end. A lure is attached to an end of the fishing line. When a fish strikes the lure, the actuating fishing line release is rotated toward the rear fishing line release. The rear fishing line release controls the amount of force required to rotate the rotating pole. The pole portion will remain in a vertical position after the fish has struck because the rear fishing line release maintains a tight grip on the fishing line. When the pole portion is in a vertical position, a switch closes and the light source is supplied with electrical current.

In a fifth preferred embodiment, the planar board with strike indicator utilizes a rotating pole instead of an actuation assembly. The planar board with strike indicator includes a base, a light source, a switch, and the rotating pole. The base can be a planar board, or a right angle plate which may be fastened to an existing planar board. The rotating pole has an axle portion, a pole portion, a release portion, and a flag disposed at the end of the pole. The release portion extends perpendicularly outward from the axle portion at a first end thereof and the pole portion extends perpendicularly outward from the axle portion at a second end thereof. An actuating fishing line release is pivotally fastened to the base and retains the release portion such that the rotating pole is retained in a horizontal position. An extension spring biases the pole portion upward such that the rotating pole rises when the actuating fishing line release is rotated toward a rear fishing line release.

A fishing line is retained by a front fishing line release, the actuating fishing line release, and a rear fishing line release. A slack portion is created in the fishing line between the front and actuating fishing line releases. The front fishing line release is rigidly attached to a projection at a front end of the base, and the rear fishing line release is rigidly attached to the base at a rear end. A lure is attached to an end of the fishing line. When a fish strikes the lure, the actuating fishing line release is rotated toward the rear fishing line release. The rear fishing line release controls the amount of force required to release the rotating pole from a horizontal position. The pole portion will remain in a raised position after the fish has struck because of the spring force exerted by the extension spring. When the pole portion is released, a switch closes and the light source is supplied with electrical current.

In a sixth preferred embodiment, the planar board with strike indicator utilizes a light source. The planar board with strike indicator includes a base, the light source, and a fishing line switch. The base can be a planar board, or a right angle plate which may be fastened to an existing planar board. A fishing line is retained by a front fishing line release, a line switch, and a rear fishing line release. A slack portion is created in the fishing line between the front fishing line release and the fishing line switch. The front fishing line release is rigidly attached to a projection at a front end of the base, and the rear fishing line release is rigidly attached to the base at a rear end. A lure is attached to an end of the fishing line. When a fish strikes the lure, the fishing line is pulled out of the fishing line switch, the switch is closed and electrical current is sent to the light source from an electrical power source. The rear fishing line release controls the amount of force required to pull the fishing line out of the fishing line switch.

The illumination of the light source may be controlled by a display control device. The display control device has circuitry which sends either a constant electrical current or a pulsed electrical current. The pulsed electrical current causes the light source to flash.

In a seventh preferred embodiment, the planar board with strike indicator utilizes a rotating fishing line release. The planar board with strike indicator includes a base, the controlled light source, the rotating fishing line release, and a notch switch. The base can be a planar board, or a plate which may be fastened to an existing planar board. A fishing line is retained by a front fishing line release, a rotating fishing line release, and a rear fishing line release. A slack portion is created in the fishing line between the front fishing line release and the rotating fishing line release. The front fishing line release is rigidly attached to a projection at a front end of the base, and the rear fishing line release is rigidly attached to the base at a rear end. A lure is attached to an end of the fishing line.

The controlled light source includes a light source, a display control device, and an electrical power source. When a fish strikes the lure, a rotating fishing line release rotates away from the front fishing line release. The notch switch opens and then shorts a first wire and a second wire of the controlled light source together. The display control device of the controlled light source changes modes by either sending a constant electrical current, or a pulsing electrical current to the light source. The rear fishing line release controls the amount of force required to pull the fishing line out of the fishing line switch. The pulsed electrical current causes the light source to flash.

The pole of the tip-up assembly may also be fabricated from a flat spring steel strip. The flat spring steel strip would also have sufficient resilience to replace the extension spring. The electrical power source may drive any electrically powered device including a light source, audible alarm, or electronic transmission device. More than one type of electrically powered device may be put in parallel with the electrical power source for multiple indications of a fish strike. A fluid mercury switch or a magnetic mercury switch may be used to replace the mechanical switch of the first preferred embodiment. It is possible to have a light source powered at all times, and to power other electrically powered devices when the switch is closed.

Accordingly, it is an object of the present invention to provide a planar board with strike indicator that shows whether a fish has struck a lure attached to a fishing line during the day.

It is a further object of the present invention to provide a planar board with strike indicator that shows whether a fish has struck a lure attached to a fishing line at night.

It is yet a further object of the present invention to provide a planar board with strike indicator that shows whether a lure is tangled in weeds or on the bottom of a lake during day or night.

Finally, it is another object of the present invention to provide a strike indicator that may be fastened to an existing planar board to show whether a fish has struck a lure during the day or night.

These and additional objects, advantages, features and benefits of the present invention will become apparent from the following specification.

BRIEF DESCRIPTION OF THE DRAWINGS

FIG. 9 is a perspective view of a tip-up assembly with a pole fabricated from a flat spring steel strip in accordance with the present invention.

FIG. 10 is a perspective view of a third preferred embodiment of a planar board with strike indicator in accordance with the present invention;

FIG. 11 is a side view of a pole being retained by a sliding rod in accordance with the present invention;

DETAILED DESCRIPTION OF THE PREFERRED EMBODIMENTS

Figure 1:
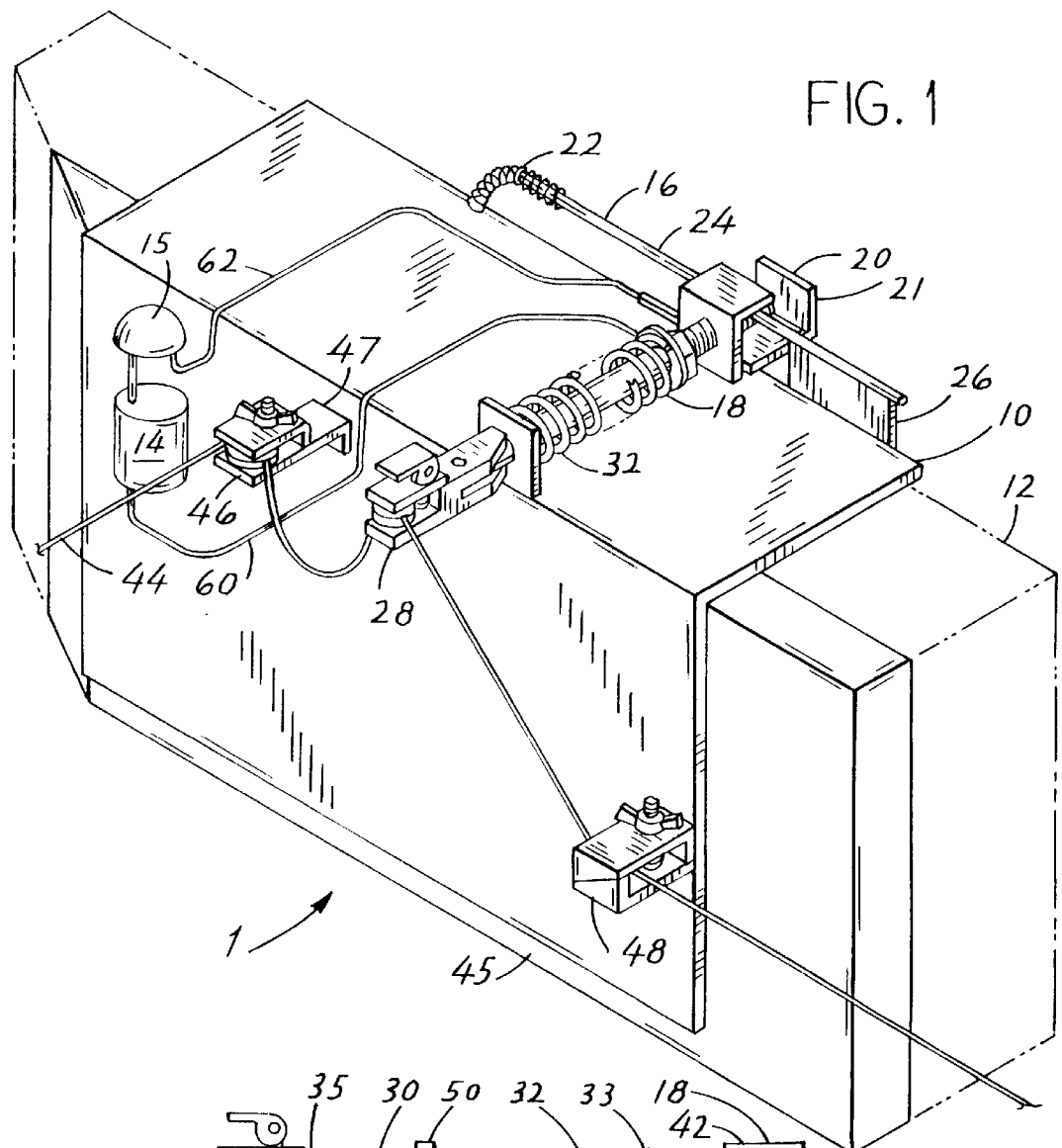
FIG. 1 is a perspective view of a first preferred embodiment of a planar board with strike indicator in accordance with the present invention.

With reference now to the drawings, and particularly to FIG. 1, there is shown a perspective view of a planar board with strike indicator 1. The planar board with strike indicator 1 includes a base, a light source 15, a tip-up assembly 16, an actuation assembly 18, and a switch 20. The base can be a planar board 12, or a right angle plate 10 which may be fastened to an existing planar board. If the right angle plate 10 is used, a layer of plastic foam 45 may be required between the existing planar board and the right angle plate 10 to compensate for lost buoyancy due to the extra weight of the right angle plate 10 and any items mounted thereupon. The plastic foam 45 may be styrofoam, urethane, or any related material with has similar buoyant properties. The tip-up assembly 16 includes an extension spring 22, a pole 24, and a flag 26 disposed at the end of the pole 24. An end of the extension spring 22 is concentrically fastened to the pole 24, and the other end of the extension spring 22 is rigidly fastened to the right angle plate 10. The normal position of the pole 24 is perpendicular to the right angle plate 10. Downward force is required to overcome the spring force of the extension spring 22 to orient the pole 24 parallel to the right angle plate 10.

Figure 2:
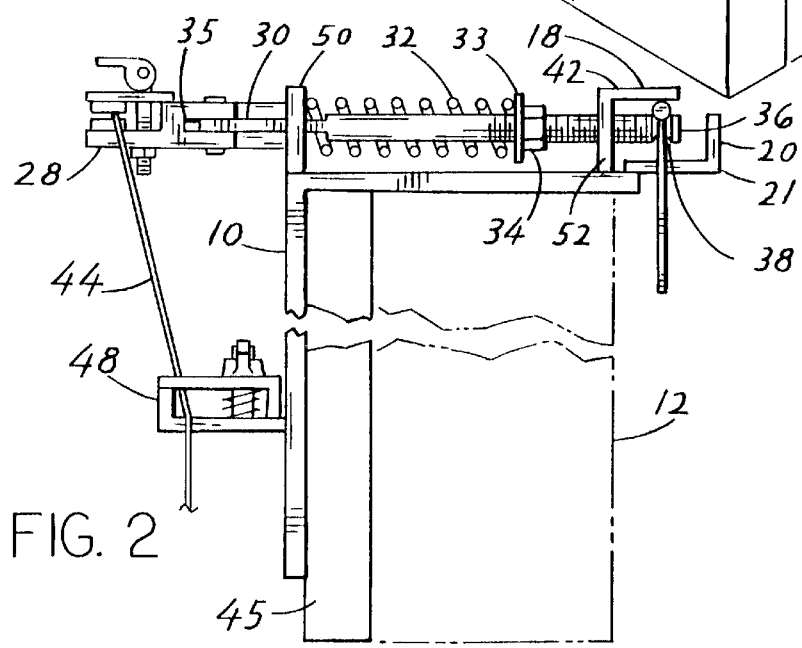
FIG. 2 is an end view of a first preferred embodiment of a planar board with strike indicator in accordance with the present invention.

With reference to FIG. 2, the actuation assembly 18 has a fishing line release 28 which is pivotally connected to a plunger 30. The switch 20 is formed from a second end 36 of the plunger 30, and an electrical contact pad 21. The actuating fishing line release 28 is retarded from pivoting by the force generated from a compression spring 32. The force exerted by the compression spring 32 may be varied through rotation of a nut 34 which is screwed on to the second end 36 of the plunger 30. Variation of force may also be achieved by holding the nut 34 stationary, and rotating the plunger 30. An increase in force requires a stronger strike by a fish to release the pole 24. The plunger 30 has a pole groove 38 disposed at the second end 36 which retains the pole 24. A first ear 50 and a second ear 52 slidably retain the plunger 30. A tab 42 extending from the second ear 52 restrains the pole 24 until the plunger 30 is actuated.

Figure 3A:
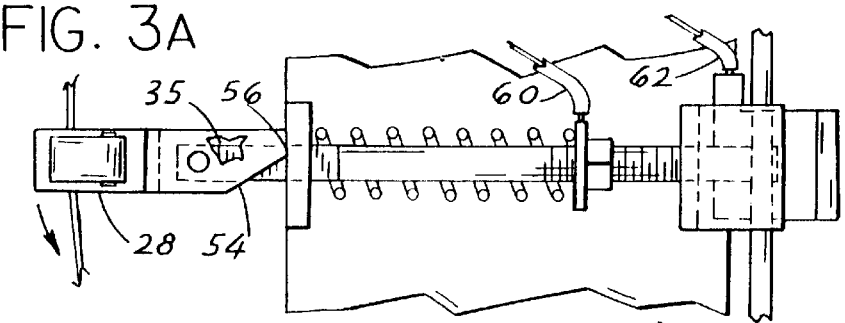
FIG. 3a is a top view of the actuation assembly before a fish has struck a fishing line in accordance with the present invention.

A fishing line 44 is retained by a front fishing line release 46, an actuating fishing line release 28, and a quick release guide 48. The quick release guide 48 allows the fish line to be quickly and easily removed. A slack portion is created in the fishing line 44 between the front fishing line release 46 and the actuating fishing line release 28. The front fishing line release 46 is rigidly attached to a projection 47 which protrudes outward from the base at a front end. The quick release guide 48 is rigidly attached to the base at a rear end. The use of the quick release guide 48 is optional. A lure is attached to the end of the fishing line 44. The plunger 30 slides axially through the first ear 50 and the second ear 52. With reference to FIG. 3a, an end of the fishing line release 28 is formed into a cam surface 54 which is pivotally connected to a first end 35 of the plunger 30. The fishing line release 28 is prevented from pivoting by the force exerted by the compression spring 32.

Figure 3B:
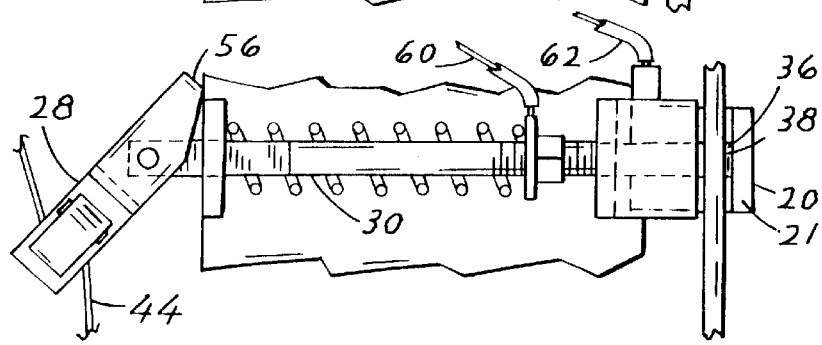
FIG. 3b is a top view of the actuation assembly after a fish has struck a fishing line in accordance with the present invention.
Figure 4:
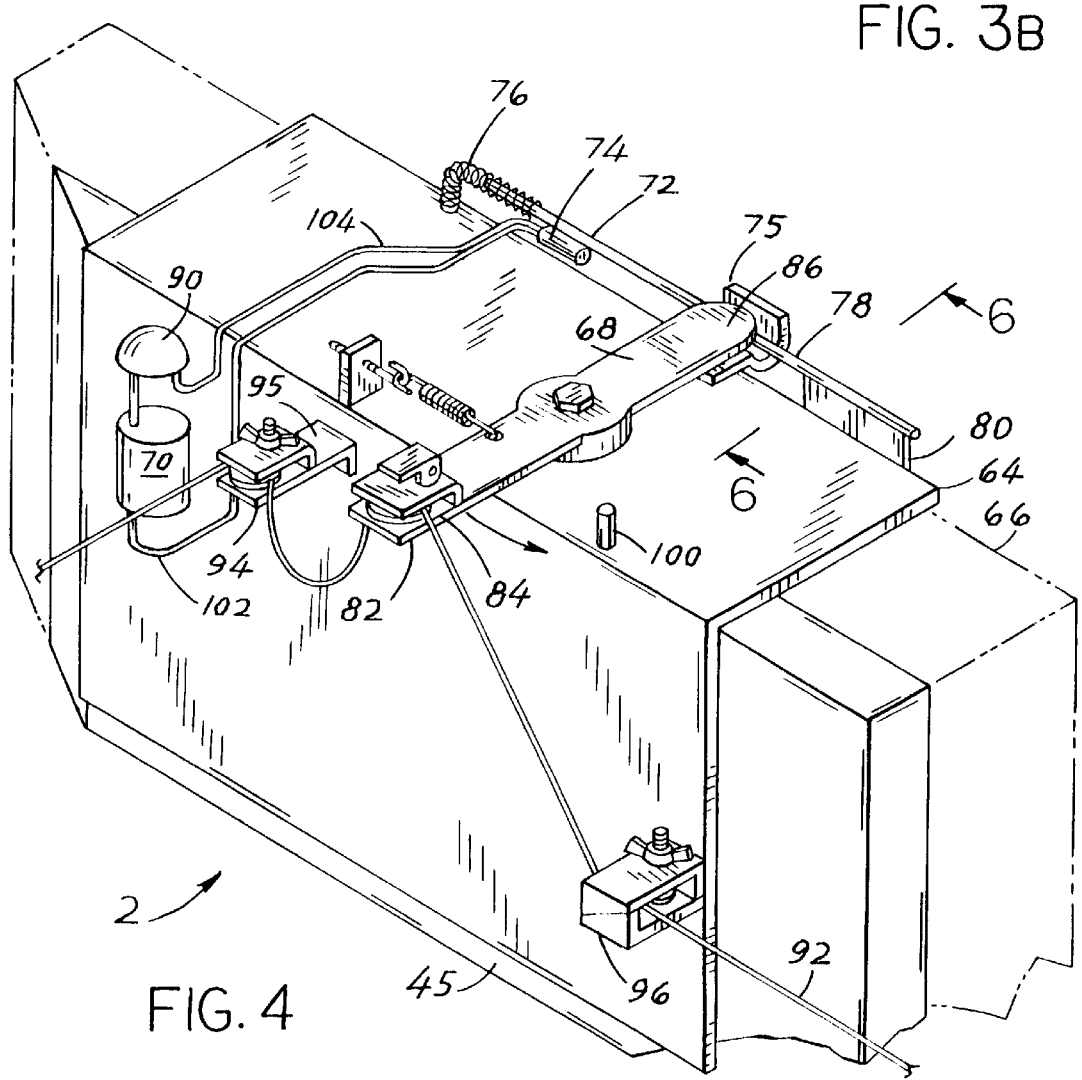
FIG. 4 is a perspective view of a second preferred embodiment of a planar board with strike indicator in accordance with the present invention.

With reference to FIG. 3b, when a fish strikes a lure attached to the fishing line 44, the actuating fishing line release 28 pivots away from the front fishing line release 46. When a straight portion 56 of the cam surface 54 is overcome, the plunger 30 is forced and retained against the electrical contact pad 21, the pole 24 is released to display the flag 26, and the light source 15 emits light. A hot wire 60 is connected from a positive terminal of an electrical power source 14 to a contact sleeve 33 which is mounted to the plunger 30. The hot wire 60 may also be fastened directly to the first ear 50 or the second ear 52 instead of the contact sleeve 33. A connection wire 62 is connected from the electrical contact pad 21 to the light source 15. A negative terminal of the electrical power source 14 is also attached to the light source 15. When the second end 36 of the plunger 30 contacts the plunger pad 21, the light source 15 is supplied with electric current. Any electrically powered device including the light source 15, an audible alarm, or an electronic transmission device may be activated to show that a fish has struck. Multiple electrically powered devices can be connected in parallel to the electrical power source 14.

In a second preferred embodiment, the planar board with strike indicator 2 utilizes a pivotal arm 68 instead of the actuation assembly 18. The planar board with strike indicator 2 includes a base, a light source 90, a tip-up assembly 72, a switch 74, and the pivotal arm 68. The base can be a planar board 66, or a right angle plate 64 which may be fastened to an existing planar board. If the right angle plate 64 is used, a layer of plastic foam 45 may be required between the existing planar board and the right angle plate 64 to compensate for lost buoyancy due to the extra weight of the right angle plate 64 and any items mounted thereupon. The tip-up assembly 72 includes an extension spring 76, a pole 78, and a flag 80 disposed at the end of the pole 78. An end of the extension spring 76 is concentrically fastened to the pole 78, and the other end of the extension spring 76 is rigidly fastened to the right angle plate 64. The normal position of the pole 78 is perpendicular to the right angle plate 64. Downward force is required to overcome the spring force of the extension spring 76 to orient the pole 78 parallel to the right angle plate 64.

Figure 5:
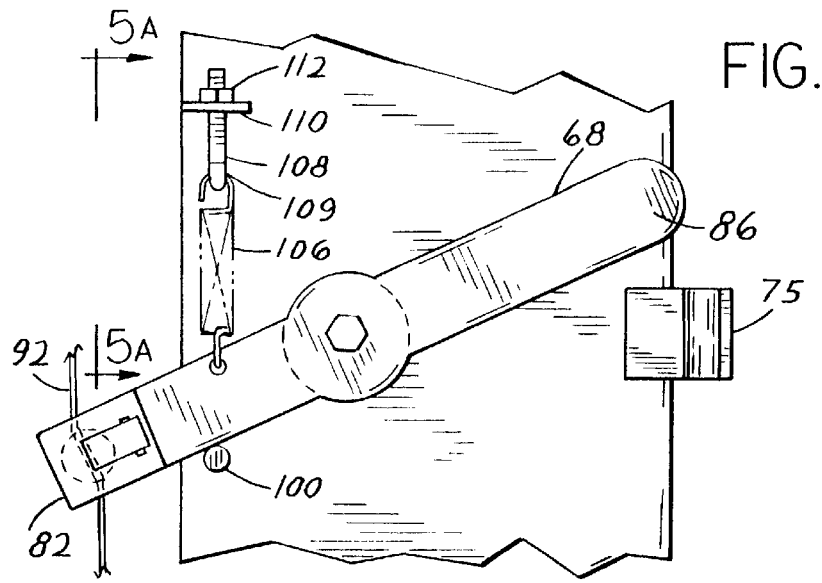
FIG. 5 is a top view of a pivotal arm after a fish has struck a fishing line in accordance with the present invention.
Figure 5A:
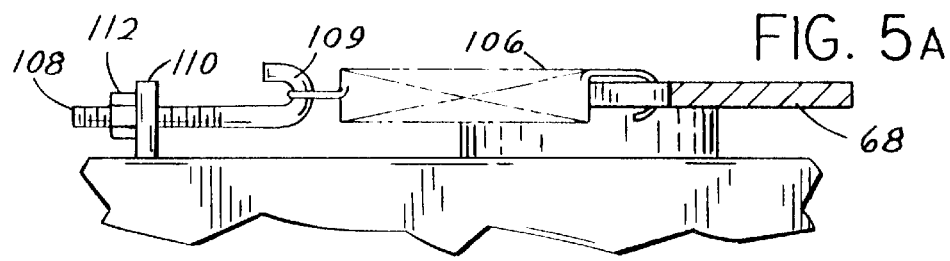
FIG. 5a is a side view of an arm extension spring being retained by a rod in accordance with the present invention.
Figure 6:
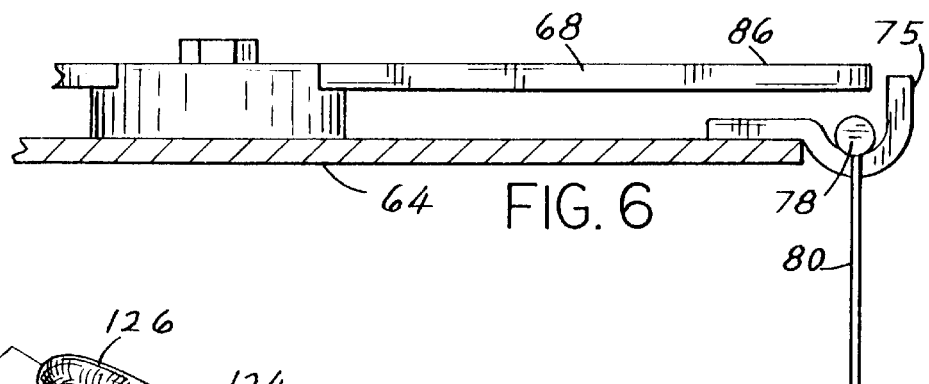
FIG. 6 is a cross sectional view of a pole being restrained by a second end of a pivotal arm in accordance with the present invention.

The pivotal arm 68 has an actuating fishing line release 82 which is rigidly fastened to a first end 84 of the pivotal arm 68. With reference to FIGS. 5 & 6, an arm extension spring 106 prevents the pivotal arm 68 from releasing the pole 78. The spring force exerted by the arm extension spring 106, can be adjusted with an adjustment nut 112. One end of the arm extension spring 106 is placed over a turned over end 109 of a rod 108, and the opposite end is inserted through a hole in the first end 84 of the pivotal arm 68. The rod 108 is inserted through a projection 110. The location of the rod 108 is maintained by the adjustment nut 112. An increase in force by the arm extension spring 106 requires a stronger strike by a fish to release the pole 122.

A fishing line 92 is retained by a front fishing line release 94, an actuating fishing line release 82, and a quick release guide release 96. The quick release guide 96 allows the fishing line to be quickly and easily removed. A slack portion is created in the fishing line 92 between the front fishing line release 94, and the actuating fishing line release 82. The front fishing line release 94 is rigidly attached to a projection 95 which protrudes outward from the base at a front end. The quick release guide 96 is rigidly attached to the base at a rear end. The use of the quick release guide 96 is optional. A lure is attached to an end of the fishing line 92.

When a fish strikes the lure, the pivotal arm 68 is rotated away from the front fishing line release 94. The rotation of the pivotal arm 68 is constrained by a stop pin 100. When the second end 86 of the pivotal arm 68 clears the pole 78 which is horizontally constrained in a retainer 75; the pole 78 is released to display the flag 80. A first wire 102 is connected from a positive terminal of an electrical power source 70 to the switch 74. A second wire 104 is connected from the switch to the light source 90. A negative terminal of the electrical power source 70 is also attached to the light source 90. When the pole 78 is released, the switch is closed and the light source 90 is supplied with electrical current. Any electrically powered device including the light source 15, an audible alarm, or an electronic transmission device may be activated to show that a fish has struck. Multiple electrically powered devices can be connected in parallel to the electrical power source 70.

Figure 7:
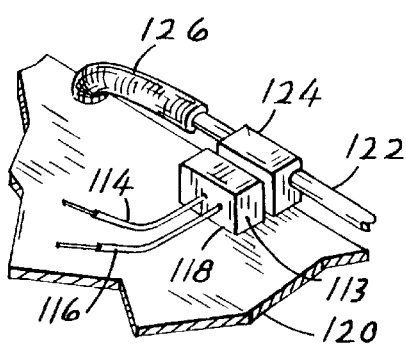
FIG. 7 is a perspective view of a tip-up assembly with a magnetic mercury switch in accordance with the present invention.

FIG. 7 shows a perspective view of a tip-up assembly 126 with a magnetic mercury switch 113. This type of switch is used in burglary systems for indicating when a door or window has been opened. The switch pole 118 of the magnetic mercury switch 113 is fastened to the base 120. The magnet pole 124 of the magnetic mercury switch 113 is fastened to a pole 122 of the tip-up assembly 126. When the tip-up assembly 126 is released the circuit is closed between a first wire 114 and a second wire 116. Any electrically powered device connected to an electrical power source will be activated. The magnetic mercury switch 113 may be substituted for the electrical contact pad 21 and the plunger 30. The first wire 114 and second wire 116 replace the hot wire 60 and the connection wire 62 of the first preferred embodiment.

Figure 8:
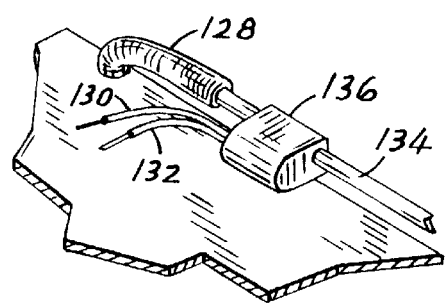
FIG. 8 is a perspective view of a tip-up assembly with a fluid mercury switch in accordance with the present invention.

FIG. 8 shows a perspective view of a tip-up assembly 128 with a fluid mercury switch 136. The fluid mercury switch 136 is fastened to a pole 134 of the tip-up assembly 128 such that an open circuit is created when the tip-up assembly 128 is in a horizontal position. When the tip-up assembly 126 is released, the circuit is closed between a first wire 130 and a second wire 132. Any electrically powered device connected to an electrical power source will be activated. The fluid mercury switch 136 may be substituted for the electrical contact pad 21 and the plunger 30. The first wire 114 and second wire 116 replace the hot wire 60 and connection wire 62 of the first preferred embodiment.

FIG. 9 shows a preferred embodiment of a tip-up assembly 138 having a flat spring steel pole 140 and a flag 142. The plunger 30, or a pivoting arm 144 with a stop pin 146 can be used to retain the tip-up assembly in a horizontal position.

FIG. 10 shows a third preferred embodiment of the planar board with strike indicator 3. The planar board with strike indicator 3 utilizes a sliding rod 162 instead of the actuation assembly 18. The planar board with strike indicator 3 includes a base, a light source 153, a tip-up assembly 154, a switch 176, and the sliding rod 162. The base can be a planar board 150, or a right angle plate 148 which may be fastened to an existing planar board. If the right angle plate 148 is used, a layer of plastic foam 45 may be required between the existing planar board and the right angle plate 148 to compensate for lost buoyancy due to the extra weight of the right angle plate 148 and any items mounted thereupon. The tip-up assembly 154 includes a pole 156, and a flag 158 disposed at the end of the pole 156. The pole 156 is fabricated from a strip of spring steel. The tip-up assembly 154 may also be the same type used in the first embodiment, with an extension spring, a rigid pole, and a flag. The normal position of the pole 156 is perpendicular to the right angle plate 148. Downward force is required to overcome the spring force of the pole 156 to orient thereof parallel to the right angle plate 148.

The sliding rod 162 is slidably retained by a first ear 164 and a second ear 166. The sliding rod 162 has an actuating fishing line release 160 which is rigidly fastened to a first end 163 of the sliding rod 162. With reference to FIG. 11, a retention clip 174 fastened to a second end of the sliding rod 162. The retention clip 174 retains the pole 156 in a horizontal position. The actuating fishing line release 160 is biased toward the pole 156 by a compression spring 182 and a retaining pin 184. A fishing line 168 is retained by a front fishing line release 170, an actuating fishing line release 160, and a rear fishing line release 172. A nut may be substituted for the retaining pin 184. Rotation of the sliding rod 162 relative to the nut would allow adjustment of the spring force exerted by the compression spring 182. If the nut is substituted for the retaining pin 184, the rear fishing line release 172 may not be required. Increasing the pressure exerted by the rear fishing line release 172 on the fishing line 168, or increasing the force of the compression spring 182 requires a stronger strike by a fish to release the pole 156. A slack portion is created in the fishing line 168 between the front fishing line release 170, and the actuating fishing line release 160. The front fishing line release 170 is rigidly attached to a projection 171 which protrudes outward from the base at a front end. The rear fishing line release 172 is rigidly attached to the base at a rear end. A lure is attached to the end of the fishing line 168.

When a fish strikes the lure, the sliding rod 162 is pulled away from the tip-up assembly 174; the pole 176 is released from under the retention clip 174. The rear fishing line release 172 may be used to control the amount of force required to release the pole 156 or as a line guide. If the nut is substituted for the retaining pin 184, rotation of the sliding rod 162 controls the amount of force required to release the pole 156. When the pole 156 is released, a switch 176 is closed and the light source 153 is supplied with electrical current. The switch 176 can be either a magnetic mercury switch or a fluid mercury switch. A first wire 178 is connected from a positive terminal of an electrical power source 152 to the switch 176. A second wire 180 is connected from the switch 176 to the light source 153. A negative terminal of the electrical power source 152 is also attached to the light source 153. Any electrically powered device including the light source 153, an audible alarm, or an electronic transmission device may be activated to show that a fish has struck. Multiple electrically powered devices can be connected in parallel to the electrical power source 152.

Figure 12:
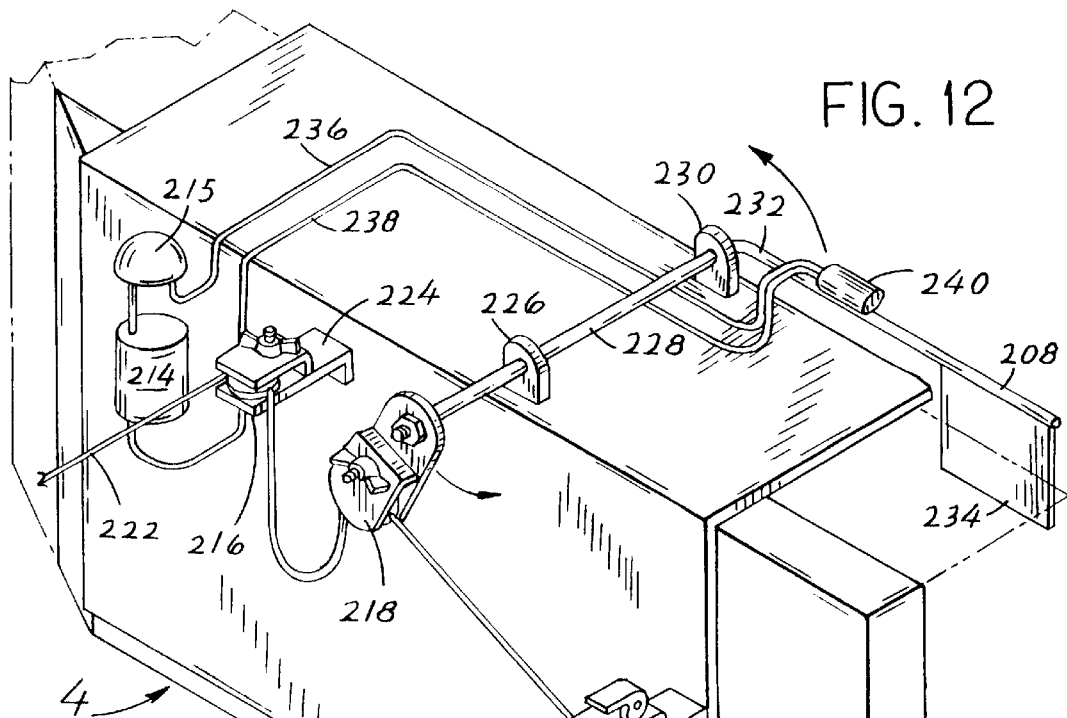
FIG. 12 is a perspective view of a fourth preferred embodiment of a planar board with strike indicator in accordance with the present invention.

FIG. 12 shows a fourth preferred embodiment of the planar board with strike indicator 4. The planar board with strike indicator 4 utilizes a rotating pole 208 instead of the actuation assembly 18 and the tip-up assembly 16. The planar board with strike indicator 4 includes a base, a light source 215, a switch 240, and the rotating pole 208. The base can be a planar board 212, or a right angle plate 210 which may be fastened to an existing planar board. If the right angle plate 212 is used, a layer of plastic foam 45 may be required between the existing planar board and the right angle plate 210 to compensate for lost buoyancy due to the extra weight of the right angle plate 210 and any items mounted thereupon. The rotating pole 208 has an axle portion 228, a pole portion 232, and a flag 234 disposed at the end of the pole portion 232. An actuating fishing line release 218 is fastened to the end of the axle portion 228. The normal position of the pole portion 228 is perpendicular to the right angle plate 210. The axle portion 228 is rotatably retained by a first axle ear 226 and a second axle ear 230.

A fishing line 222 is retained by a front fishing line release 216, an actuating fishing line release 218, and a rear fishing line release 220. Increasing the pressure exerted by the rear fishing line release 220 on the fishing line 222 requires a stronger strike by a fish to raise the pole portion 232. A slack portion is created in the fishing line 222 between the front fishing line release 216, and the actuating fishing line release 218. The front fishing line release 216 is rigidly attached to a projection 224 which protrudes outward from the base at a front end. The rear fishing line release 220 is rigidly attached to the base at a rear end. A lure is attached to the end of the fishing line 222.

When a fish strikes the lure, the actuating fishing line release 218 is rotated toward the rear fishing line release 220. The rear fishing line release 220 is used to control the amount of force required to release the pole portion 228. When the pole portion is raised, the switch 240 is closed and the light source 215 is supplied with electrical current. The switch 240 can be either a magnetic mercury switch or a fluid mercury switch. A first wire 236 is connected from a positive terminal of an electrical power source 214 to the switch 240. A second wire 238 is connected from the switch 240 to the light source 215. A negative terminal of the electrical power source 214 is also attached to the light source 215. Any electrically powered device including the light source 215, an audible alarm, or an electronic transmission device may be activated to show that a fish has struck. Multiple electrically powered devices may be connected in parallel to the electrical power source 214.

Figure 13:
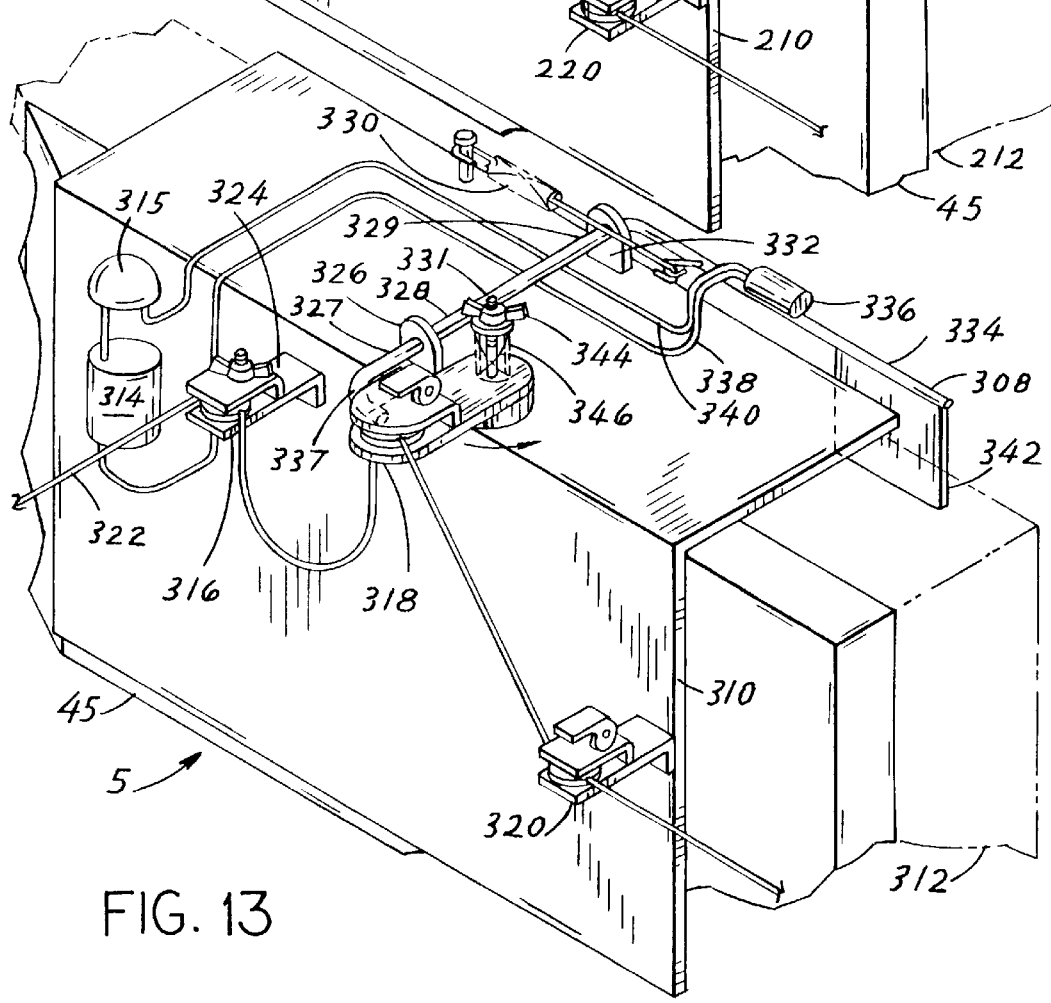
FIG. 13 is a perspective view of a fifth preferred embodiment of a planar board with strike indicator in accordance with the present invention.

FIG. 13 shows a fifth preferred embodiment of the planar board with strike indicator 5. The planar board with strike indicator 5 utilizes a rotating pole 308 instead of the actuation assembly 18 and the tip-up assembly 16. The planar board with strike indicator 5 includes a base, a light source 315, a switch 336, and the rotating pole 308. The base can be a planar board 312, or a right angle plate 310 which may be fastened to an existing planar board. If the right angle plate 310 is used, a layer of plastic foam 45 may be required between the existing planar board and the right angle plate 310 to compensate for lost buoyancy due to the extra weight of the right angle plate 310 and any items mounted thereupon. The rotating pole has an axle portion 328, a pole portion 334, a release portion 337, and a flag 342 disposed at the end of the pole portion 334. The release portion 337 extends perpendicularly outward from the axle portion 328 at a first end 327 thereof and the pole portion 334 extends outward perpendicularly outward from the axle portion at a second end 329 thereof. The axle portion 328 is rotatably retained by a first axle ear 326 and a second axle ear 332. An actuating fishing line release 318 is pivotally fastened to the base and retains the release portion 337 such that the rotating pole 308 is retained in a horizontal position. A hole is formed through an end of the actuating fishing line release 318. A stud 331 is fastened to the base, the actuating fishing line release 318 is placed over the stud 331. A compression spring 346 is placed over the stud 331 and a wing nut 344 is threaded on to thereof. The wing nut 344, the stud 331, and the compression spring 346 are utilized to restrain the actuating fishing line release 318 from unnecessary rotation. An extension spring 330 biases the pole portion 334 upward such that the rotating pole 308 rises when the actuating fishing line release 318 is rotated toward a rear fishing line release 320. Downward force is required to overcome the spring force of the extension spring 330 to orient thereof parallel to the right angle plate 310. A torsion spring may be substituted for the extension spring 330. An end of the torsion spring would be fastened to the axle portion, an opposite end thereof would be constrained by the base.

A fishing line 322 is retained by a front fishing line release 316, an actuating fishing line release 318, and a rear fishing line release 320. Increasing the pressure exerted by the rear fishing line release 320 on the fishing line 322 requires a stronger strike by a fish to release the pole 156. A slack portion is created in the fishing line 322 between the front fishing line release 316, and the actuating fishing line release 318. The front fishing line release 316 is rigidly attached to a projection 324 which protrudes outward from the base at a front end. The rear fishing line release 320 is rigidly attached to the base at a rear end. A lure is attached to the end of the fishing line 322.

When a fish strikes the lure, the actuating fishing line release 318 is rotated toward the rear fishing line release 320. The rear fishing line release 320 controls the amount of force required to release the rotating pole 308. The pole portion 334 will remain in a raised position after the fish has struck because of the spring force exerted by the extension spring 330. When the pole portion 334 is released, a switch 336 is closed and the light source 315 is supplied with electrical current. The switch 336 can be either a magnetic mercury switch or a fluid mercury switch. A first wire 338 is connected from a positive terminal of an electrical power source 314 to the switch 336. A second wire 338 is connected from the switch 336 to the light source 315. A negative terminal of the electrical power source 314 is also attached to the light source 315. Any electrically powered device including the light source 315, an audible alarm, or an electronic transmission device may be activated to show that a fish has struck. Multiple electrically powered devices can be connected in parallel to the electrical power source 314. The rotating pole 308 may be substituted for the actuation assembly 18 and the tip-up assembly 16 of the first preferred embodiment of the planar board with strike indicator 1.

Figure 14:
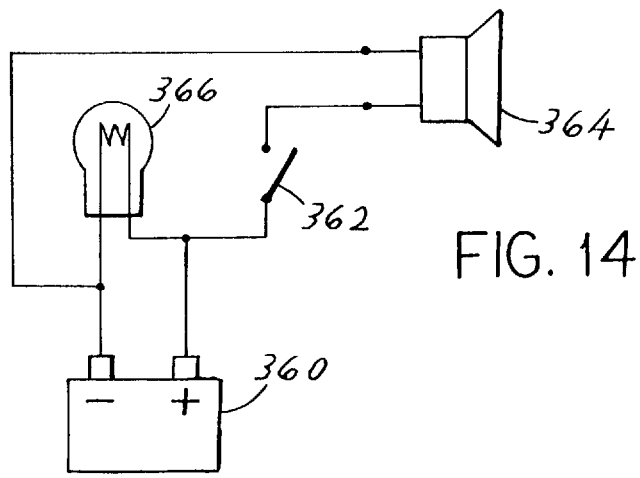
FIG. 14 is a schematic diagram of a constantly powered light source with an electrically powered device which may be powered when a switch is closed in accordance with the present invention.

FIG. 14 shows a schematic diagram of a constantly powered light source 366 with an electrically powered device 364 which may be powered by an electrical power source 360 when a switch 362 is closed. It may be advantageous to constantly illuminate a planar board during night time fishing. A flag made of reflective material would be visible when a pole is released. The switch 362 may be used in conjunction with the constantly powered light source 366 to indicate a fish strike. When the switch 362 closes, an audible alarm 364 may sound, or an electronic transmission device may send out a message. The constantly powered light source 366 may be adapted for use with preferred embodiments one through five.

Figure 15:
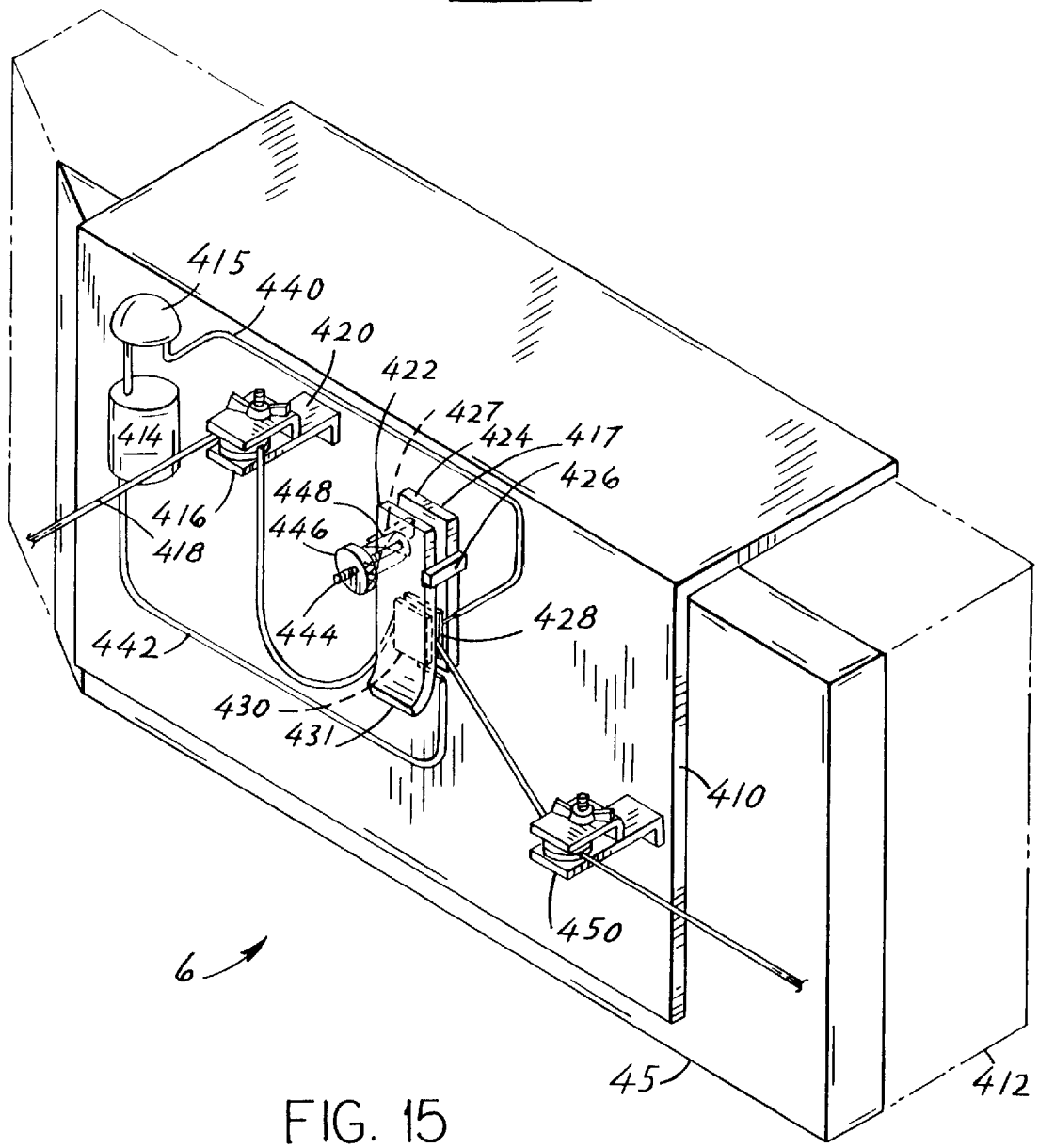
FIG. 15 is a perspective view of a sixth preferred embodiment of a planar board with strike indicator in accordance with the present invention.

FIG. 15 shows a sixth preferred embodiment of the planar board with strike indicator 6. The planar board with strike indicator 6 utilizes a light source 415 instead of the actuation assembly 18 and the tip-up assembly 16. The planar board with strike indicator 6 includes a base, the light source 415, and a fishing line switch 417. The base can be a planar board 412, or a right angle plate 410 which may be fastened to an existing planar board. If the right angle plate 410 is used, a layer of plastic foam 45 may be required between the existing planar board and the right angle plate 410 to compensate for lost buoyancy due to the extra weight of the right angle plate 410 and any items mounted thereupon. A fishing line 418 is retained by a front fishing line release 416, the fishing line switch 417, and a rear fishing line release 450.

The fishing line switch includes a switch base 424, a wiper 422, a first contact pad 428, and a second contact switch 430. The first contact pad 428 is attached to the switch base 424 and the second contact pad 430 is attached to the wiper 422. A stud 444 extends outward from the switch base 424 and passes through an opening in the wiper 422. A lift tab 431 extends outward from the wiper 422 to facilitate the manipulation thereof. A compression spring 448 is placed over the stud 444, and a finger nut 446 preloads the compression spring 448. The fishing line 418 is held between the first contact pad 428 and the second contact pad 430. The pressure applied to retain the fishing line 418 between the wiper 422 and the switch base 424 is controlled by rotation of the finger nut 446. A first anti-rotation finger 426 and a second anti-rotation finger 427 extend outward from the switch base 424 and prevent the wiper 422 from rotating relative to the switch base 424.

A slack portion is created in the fishing line 418 between the front fishing line release 416, and the fishing line switch 417. The front fishing line release 416 is rigidly attached to a projection 420 which protrudes outward from the base at a front end. The rear fishing line release 450 is rigidly attached to the base at a rear end. A lure is attached to the end of the fishing line 418. Increasing the pressure exerted by the rear fishing line release 450 on the fishing line 418 requires a stronger strike by a fish to pull the fishing line 418 out of the fishing line switch 417. When the fishing line 418 is pulled out of the fishing line switch 417, the first contact pad 428 and the second contact pad 430 make electrical contact; the light source 415 is supplied with electrical current. A first wire 440 is connected from the light source 415 to the first contact pad 428. A second wire 442 is connected from the second contact pad 430 to the positive terminal of an electrical power source 414. A negative terminal of the electrical power source 414 is also attached to the light source 415. Any electrically powered device including the light source 415, an audible alarm, or an electronic transmission device may be activated to show that a fish has struck. Multiple electrically powered devices may be connected in parallel to the electrical power source 414.

Figure 16:
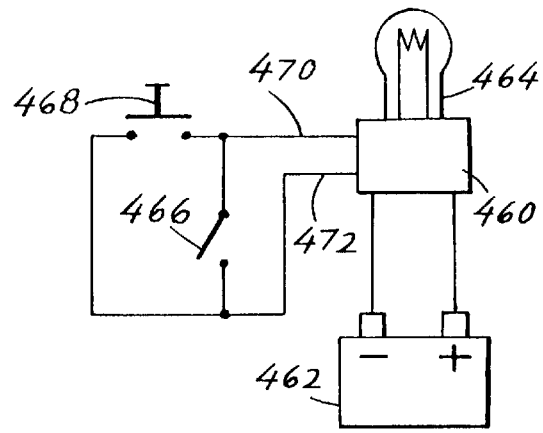
FIG. 16 is a schematic diagram of a light source with a display control circuit in accordance with the present invention.

FIG. 16 shows a schematic diagram of a light source with a display control circuit 460. The illumination of the light source 464 may be controlled by the display control device 460. The display control device 460 has circuitry which supplies either a constant electrical current or a pulsed electrical current. The pulsed electrical current causes the light source to flash. The display control circuit 460 is controlled by shorting a first line 470 to a second line 472. Shorting the first line 470 to the second line 472 may be implemented by a momentary switch 468, or a normally open switch 466. The fishing line switch 417 may be used as a normally open switch 466. The display control circuit 460 has three modes. The first mode is off, the second mode is a constant supply of current, and the third mode is pulsed current. The first line 470 is shorted to the second line 472 to advance to the next mode. The momentary switch 468 is used to advance to the proper mode, once a fishing line is placed between the switch base 424 and the wiper 422. It is preferred that the display control circuit 460 be started in a constant current mode. When a fishing line is pulled out of the fishing line switch 417, the display control circuit 460 is advanced to a pulsed current mode. The display control circuit is commonly manufactured for night time bicycle riding.

Figure 17:
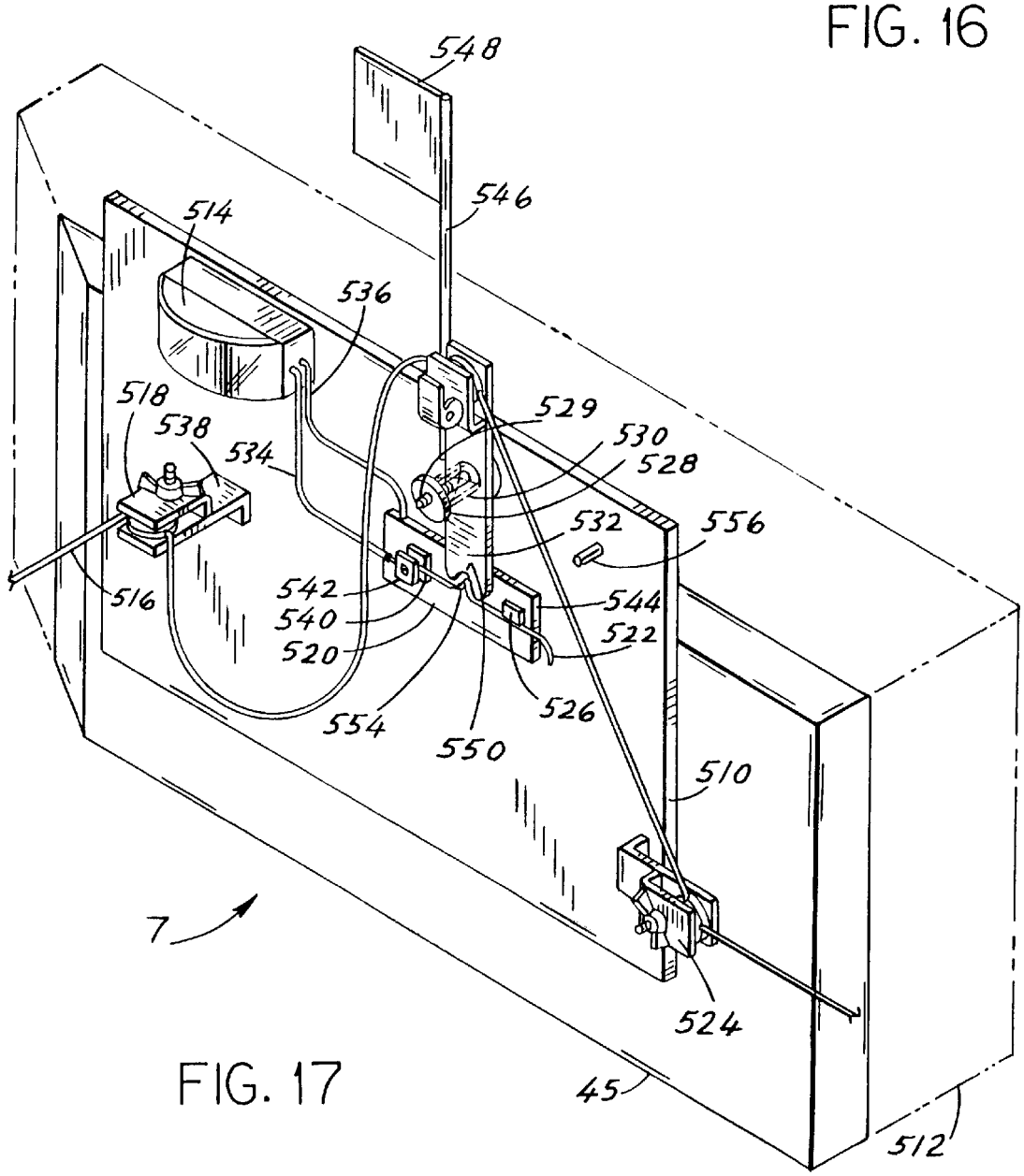
FIG. 17 is a perspective view of a seventh preferred embodiment of a planar board with strike indicator in accordance with the present invention.

FIG. 17 shows a seventh preferred embodiment of the planar board with strike indicator 7. The planar board with strike indicator 7 utilizes a rotating fishing line release 532 instead of the actuation assembly 18 and the tip-up assembly 16. The planar board with strike indicator 7 includes a base, a controlled light source 514, the rotating fishing line release 532, and a notch switch 520. The base can be a planar board 512, or a plate 510 which may be fastened to an existing planar board. If the plate 510 is used, a layer of plastic foam 45 may be required between the existing planar board and the plate 510 to compensate for lost buoyancy due to the extra weight of the plate 510 and any items mounted thereupon.

The rotating fishing line release 532 has a notch 550 disposed at an end and a fishing line release at an opposite end. The rotating fishing line release 532 is pivotally connected to the base. A stud 529 is fastened to the base, and a hole is formed in the rotating fishing line release 532 to provide clearance for thereof. A compression spring 528 is placed over the stud 529, and a finger nut 530 is threaded on to the stud 529. Tightening of the finger nut 530 creates resistance to the pivotal motion of the rotating fishing line release 532. A pole 546 is fastened to the rotating fishing line release 532 and a flag 548 is fastened to the pole 546. The notch switch 520 has a conductive base 544, a terminal 526, and a notch wiper 522. The terminal 526 is fastened and electrically connected to the conductive base 544. An insulating spacer 540 is fastened to the conductive base and a wiper holder 542 to the insulating spacer 540. The notch wiper 522 is fastened to the base holder 542. The notch wiper 522 includes a wiper offset 554 which is sized to be received by the notch 550.

A fishing line 516 is retained by a front fishing line release 518, the rotating fishing line release 532, and a rear fishing line release 524. Increasing the pressure exerted by the rear fishing line release 524 on the fishing line 518 requires a stronger strike by a fish to rotate the rotating fishing line release 532. A slack portion is created in the fishing line 516 between the front fishing line release 518, and the rotating fishing line release 532. The front fishing line release 518 is rigidly attached to a projection 538 which protrudes outward from the base at a front end. The rear fishing line release 524 is rigidly attached to the base at a rear end. A lure is attached to the end of the fishing line 516.

The controlled light source 514 includes a light source, a display control device, and an electrical power source. When a fish strikes the lure, the rotating fishing line release 532 rotates away from the front fishing line release 518, the offset 554 is forced out of the notch 550 which opens the connection between a first wire 534 and a second wire 536 of the controlled light source 514. The offset 554 of the notch wiper 522 will ride on the outside contour of the rotating fishing line release 532. The notch wiper 522 will contact the terminal 526 when the rotating fishing line release 532 rotates far enough to strike the stop pin 556.

When the rotating fishing line release is stopped by the stop pin 556, the flag 548 is lowered indicating a fish strike. The display control device of the controlled light source 514 changes modes when the first wire 534 and the second wire 536 are shorted together. When the first wire 534 and the second wire 536 are shorted, the display control device will send a constant electrical current, or a pulsing electrical current to the light source. The controlled light source 514 is commonly manufactured for night time bicycle riding.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A planar board with strike indicator comprising:
   a base;
   a tip-up assembly having a pole;
   a plunger having a first end and a second end;
   a first ear and a second ear slidably retaining said plunger; and
   an actuating fishing line release engaging a fishing line between two opposing surfaces such that the fishing line is firmly restrained from axial movement relative to said actuating fishing line release, an end of said actuating fishing line release being pivotally connected to said first end of said plunger, wherein when said actuating fishing line release is pivoted by the strike of a fish, said second end of said plunger making an axial movement which causes said pole to clear said second ear.

2. The planar board with strike indicator of claim 1, further comprising:
   a compression spring; and
   a nut being rotated on said plunger to decrease the compressed length of said compression spring, the force required to pivot said actuating fishing line release relative to said plunger being increased as the compressed length of said compression spring is decreased.

3. The planar board with strike indicator of claim 2, further comprising:
   a tab extending outward from said second ear; and
   said second end of said plunger having a pole groove which is sized to receive the cross section of said pole, wherein when said actuating fishing line release is pulled by a fish strike, said second end of said plunger moving past said tab, said pole being released and indicating a fish strike.

4. The planar board with strike indicator of claim 1, further comprising:
   a flag being fastened to an end of said pole, said pole being fabricated from a flat spring steel strip.

5. The planar board with strike indicator of claim 1, further comprising:
   a flag being fastened to an end of said pole; and
   an extension spring, said extension spring being mounted between said base and said pole.

6. The planar board with strike indicator of claim 1, further comprising:
   a switch;
   an electrical power source;
   an electrically powered device is supplied with electrical current from said electrical power source when said switch is closed; and
   a front fishing line release being fastened to a projection protruding from said base at a front end, said front fishing line release and said actuating fishing line release retaining a fishing line, a slack portion being formed in the fishing line between said front fishing line release and said actuating fishing line release, wherein when a lure attached to the fishing line is struck, said actuating fishing line release pivoting away from said front fishing line release, wherein said switch being closed.

7. The planar board with strike indicator of claim 6, further comprising:
   a quick release guide being fastened to said base at a rear end, said fishing line being quickly and easily placed into said quick release guide.

8. The planar board with strike indicator of claim 6, further comprising:
   said switch being formed from said second end of said plunger, and an electrical contact pad.

9. The planar board with strike indicator of claim 8, further comprising:
   a contact sleeve being retained between said compression spring and said nut.

10. The planar board with strike indicator of claim 6, further comprising:

said electrically powered device being a light source.

11. The planar board with strike indicator of claim 10, wherein:
said light source being constantly powered by said electrical power source.

12. The planar board with strike indicator of claim 6, further comprising:
said electrically powered device being an audible alarm.

13. The planar board with strike indicator of claim 6, further comprising:
said electrically powered device being an electronic transmission device.

14. The planar board with strike indicator of claim 6, further comprising:
said base being a right angle plate, said right angle plate being fastenable to an existing planar board.

15. The planar board with strike indicator of claim 14, further comprising:
a quantity of plastic foam being added between said right angle plate, and the existing planar board.

16. A planar board with strike indicator comprising:
a base;
a switch;
an electrical power source;
an electrically powered device;
a plunger having a first end and a second end;
a first ear and a second ear slidably retaining said plunger; and
an actuating fishing line release engaging a fishing line between two opposing surfaces such that the fishing line is firmly restrained from axial movement relative to said actuating fishing line release, an end of said actuating fishing line release being pivotally connected to said first end of said plunger, wherein when said actuating fishing line release is pivoted by the strike of a fish, said plunger making an axial movement which closes said switch, said electrical power source being supplied with electrical current.

17. The planar board with strike indicator of claim 16, further comprising:
a compression spring; and
a nut being rotated on said plunger to decrease the compressed length of said compression spring, the force required to pivot said actuating fishing line release relative to said plunger being increased as the compressed length of said compression spring is decreased.

18. The planar board with strike indicator of claim 17, further comprising:
a tip-up assembly having a pole;
a flag being fastened to said pole;
a tab extending outward from said second ear; and
said second end of said plunger having a pole groove which is sized to receive the cross section of said pole, wherein when said actuating fishing line release is pulled by a fish strike, said second end of said plunger moving past said tab, said pole being released and indicating a fish strike.

19. The planar board with strike indicator of claim 18, wherein:
said pole being fabricated from a flat spring steel strip, said pole being mounted to said base.

20. The planar board with strike indicator of claim 19, further comprising:

said tip-up assembly having an extension spring, said extension spring being mounted to said base; and
said pole being fastened to said extension spring.

21. The planar board with strike indicator of claim 17, further comprising:
said switch being formed from said second end of said plunger, and an electrical contact pad.

22. The planar board with strike indicator of claim 21, further comprising:
a contact sleeve being retained between said compression spring and said nut.

23. The planar board with strike indicator of claim 16, further comprising:
a front fishing line release being fastened to a projection protruding from said base at a front end, said front fishing line release and said actuating fishing line release retaining a fishing line, a slack portion being formed in the fishing line between said front fishing line release and said actuating fishing line release, wherein when a lure attached to the fishing line is struck, said actuating fishing line release pivoting away from said front fishing line release, said electrically powered device and said flag indicating a fish strike.

24. The planar board with strike indicator of claim 23, further comprising:
a quick release guide being fastened to said base at a rear end, said fishing line being quickly and easily placed into said quick release guide.

25. The planar board with strike indicator of claim 23, further comprising:
said electrically powered device being a light source.

26. The planar board with strike indicator of claim 23, wherein:
said light source being constantly powered by said electrical power source.

27. The planar board with strike indicator of claim 23, further comprising:
said electrically powered device being an audible alarm.

28. The planar board with strike indicator of claim 23, further comprising:
said electrically powered device being an electronic transmission device.

29. The planar board with strike indicator of claim 16, further comprising:
said base being a right angle plate, said right angle plate being fastenable to an existing planar board.

30. The planar board with strike indicator of claim 29, further comprising:
a quantity of plastic foam being added between said right angle plate, and the existing planar board.

31. A planar board with strike indicator comprising:
a base;
a switch;
a light source;
an electrical power source being mounted to said base;
a tip-up assembly having an extension spring, a pole, and a flag fastened to said pole, said extension spring being mounted to said base;
a plunger having a first end and a second end;
a first ear and a second ear slidably retaining said plunger; and
an actuating fishing line release engaging a fishing line between two opposing surfaces such that the fishing line is firmly restrained from axial movement relative to said actuating fishing line release, an end of said actuating fishing line release being pivotally connected to said first end of said plunger, wherein when said actuating fishing line release is pivoted by the strike of a fish, said plunger making an axial movement which closes said switch, said light source emitting light.

32. The planar board with strike indicator of claim 31, further comprising:

a compression spring; and a nut being rotated on said plunger to decrease the compressed length of said compression spring, the force required to pivot said actuating fishing line release relative to said plunger being increased as the compressed length of said compression spring is decreased.

33. The planar board with strike indicator of claim 32, further comprising:

a tab extending outward from said second ear; and said second end of said plunger having a pole groove which is sized to receive the cross section of said pole, wherein when said actuating fishing line release is pulled by a fish strike, said second end of said plunger moving past said tab, said pole being released and indicating a fish strike.

34. The planar board with strike indicator of claim 33, further comprising:

a contact sleeve being retained between said compression spring and said nut;

a hot wire being connected between a positive terminal of said electrical power source and said contact sleeve;

a connection wire being connected between said electrical contact pad and said light source; and a negative terminal of said electrical power source being connected to said light source.

35. The planar board with strike indicator of claim 31, further comprising:

a front fishing line release being fastened to a projection protruding from said base at a front end, a quick release guide being fastened to said base at a rear end; and said front fishing line release, said actuating fishing line release, and said quick release guide retaining a fishing line, a slack portion being formed in the fishing line between said front fishing line release and said actuating fishing line release, wherein when a lure attached to the fishing line is struck, said actuating fishing line release pivoting away from said front fishing line release, said light source and said flag indicating a fish strike.

36. The planar board with strike indicator of claim 31, further comprising:

said switch being formed from said second end of said plunger, and an electrical contact pad.

\* \* \* \* \*